(12) United States Patent
Lionetti

(10) Patent No.: US 7,598,877 B2
(45) Date of Patent: Oct. 6, 2009

(54) TRANSPONDER CARRIER FOR A TIRE

(75) Inventor: Robert Edward Lionetti, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 136 days.

(21) Appl. No.: 11/442,889

(22) Filed: May 30, 2006

(65) Prior Publication Data

US 2007/0279202 A1 Dec. 6, 2007

(51) Int. Cl.
G08B 13/14 (2006.01)

(52) U.S. Cl. .................. 340/572.8; 152/152.1; 343/872

(58) Field of Classification Search ................ 340/572, 340/8; 152/152.1; 343/872
See application file for complete search history.

(56) References Cited

U.S. PATENT DOCUMENTS

| | | | | |
|---|---|---|---|---|
| 3,783,925 A | * | 1/1974 | Boileau | 152/556 |
| 3,853,164 A | * | 12/1974 | Mirtain | 152/209.5 |
| 4,017,654 A | * | 4/1977 | Evans et al. | 428/40.3 |
| 4,745,956 A | * | 5/1988 | Yagi et al. | 152/527 |
| 5,573,611 A | | 11/1996 | Koch et al. | 152/152.1 |
| 5,971,046 A | | 10/1999 | Koch et al. | 152/152.1 |
| 6,244,104 B1 | | 6/2001 | Koch et al. | 73/146 |
| 6,309,494 B1 | | 10/2001 | Koch et al. | 156/153 |
| 6,388,567 B1 | | 5/2002 | Bohm et al. | 340/442 |
| 6,443,198 B1 | | 9/2002 | Koch et al. | 152/152.1 |
| 6,444,069 B1 | | 9/2002 | Koch et al. | 156/123 |
| 6,474,380 B1 | | 11/2002 | Rensel et al. | 152/152.1 |
| 6,477,894 B1 | | 11/2002 | Koch et al. | 73/146 |
| 6,524,415 B1 | | 2/2003 | Youngman et al. | 156/123 |
| 6,546,982 B1 | | 4/2003 | Brown et al. | 152/152.1 |
| 6,653,936 B2 | | 11/2003 | Bohm et al. | 340/442 |
| 6,668,884 B2 | | 12/2003 | Koch et al. | 152/152.1 |
| 6,670,223 B2 | * | 12/2003 | Gaynes et al. | 438/118 |
| 6,688,353 B1 | | 2/2004 | Koch | 152/152.1 |
| 6,705,365 B1 | | 3/2004 | Wilson | 152/152.1 |
| 6,788,192 B2 | | 9/2004 | Skimura | 340/447 |
| 6,798,140 B2 | | 9/2004 | Reim et al. | 315/76 |
| 6,860,303 B2 | | 3/2005 | Rensel et al. | 152/152.1 |
| 6,885,291 B1 | | 4/2005 | Pollack et al. | 340/445 |
| 7,151,495 B2 | * | 12/2006 | Strache et al. | 343/713 |
| 2004/0017291 A1 | | 1/2004 | Hardman et al. | 340/505 |
| 2004/0094251 A1 | | 5/2004 | Strache et al. | 152/152.1 |
| 2004/0127121 A1 | * | 7/2004 | Schwab et al. | 442/46 |

(Continued)

FOREIGN PATENT DOCUMENTS

EP 350944 * 1/1990

*Primary Examiner*—Benjamin C Lee
*Assistant Examiner*—Ojiako Nwugo
(74) *Attorney, Agent, or Firm*—Richard B. O'Planick

(57) ABSTRACT

A transponder carrier for embedded incorporation into a rubber article includes a bonding layer; a base layer affixed to the bonding layer, the base layer having a support surface for supporting a transponder device; and a reinforcement cap affixed to the base layer supporting surface at least partially covering the transponder device. The cap may be composed of textile cord reinforced rubber, the cap textile cords arranged in a substantially square woven configuration. A ratio of the cap to transponder device areas is within a range of 2:1 to 8:1 and the transponder device may further be coated with an adhesive to bond the transponder device to the cap and to the base layer. An antenna in a dipole antenna configuration is coupled to the transponder device in one construction.

20 Claims, 3 Drawing Sheets

U.S. PATENT DOCUMENTS

| | | |
|---|---|---|
| 2004/0134578 A1 | 7/2004 | Kleckner et al. .......... 152/152.1 |
| 2004/0140030 A1 | 7/2004 | Hahn et al. .............. 152/152.1 |
| 2004/0182494 A1 | 9/2004 | Dominak et al. ......... 156/110.1 |
| 2005/0059308 A1 | 3/2005 | Parsons et al. .............. 442/149 |
| 2005/0076982 A1* | 4/2005 | Metcalf et al. ........... 152/152.1 |
| 2005/0076992 A1 | 4/2005 | Metcalf et al. ........... 156/110.1 |
| 2005/0101060 A1* | 5/2005 | Tsunoda et al. ............. 438/127 |
| 2005/0222318 A1* | 10/2005 | Chauvin ..................... 524/496 |
| 2005/0236219 A1* | 10/2005 | Saito et al. .................. 180/433 |
| 2005/0255766 A1* | 11/2005 | Kruger et al. ................. 442/21 |
| 2007/0102115 A1* | 5/2007 | Falke ........................ 156/335 |
| 2007/0107824 A1* | 5/2007 | Hahn et al. ................. 152/565 |

* cited by examiner

TRANSPONDER CARRIER FOR A TIRE

FIELD OF THE INVENTION

The invention relates generally to a device for embedding a sensing device into a rubber article and, more specifically, to a device for embedding an RFID transponder into a tire.

BACKGROUND OF THE INVENTION

It is necessary in myriad commercial product applications to embed a sensing device into a rubber article for the purpose of sensing a physical parameter of the article. One such application is the incorporation of a relatively rigid RFID transponder into a tire in order to detect and measure the pressure within the tire and communicate the pressure level to an external reader. Efforts at achieving transponder carriers for rubber articles such as a tire that can withstand forces resulting from continuous tire deformation and flexure during manufacture and operation have proven difficult. Structural damage to the transponder and/or carrier package can result from the stress concentrations from manufacture and use of the tire and cause transponder malfunction.

Alternative approaches to securing a rigid transponder, such as an RFID tag, and its associate carrier into a tire have been attempted with less than satisfactory results. One such approach has been to embed the transponder into tire by means of a conventional tire repair patch. Such an approach is advantageous in that the post manufacture introduction of a transponder into a tire can then be seamless, utilizing existing tire repair production lines. However, utilizing conventional patch configurations for applying a rigid transponder into a tire has not proven durable or reliable. Under certain conditions, a rigid RFID tag within a conventional tire patch may be ejected due to the stress concentrations imposed by the extreme stiffness differences between the patch and the tag during patch flexing. Moreover, patches are generally assemblies of green compound layers that are cured in compression molds. The incorporation of a tag into a patch may, due to the addition of the tag geometry, trap small quantities of air and limit any expansion of the material because of trapped air around the tag. The structural integrity of the resulting patch/tag assembly may as a result be compromised, causing separation between the tag and patch during use.

Consequently, there is a need for a convenient, cost effective transponder carrier construction that can embed a transponder, such as an RFID tag, into a tire or other rubber article. Such a construction should be capable of achieving an effective incorporation of the transponder to cured rubber or in articles in the green state. The construction should be durable at the transponder circumference to rubber interface in order to minimize the potential for transponder separation from the tag.

SUMMARY OF THE INVENTION

Pursuant to one aspect of the invention, a transponder carrier for embedded incorporation into a rubber article is achieved, including a bonding layer; a base layer affixed to the bonding layer, the base layer having a support surface for supporting a transponder device; and a reinforcement cap affixed to the base layer supporting surface at least partially covering the transponder device. The cap may be composed of textile cord reinforced rubber, the cap textile cords arranged in a substantially quadrilateral woven configuration. A ratio of the cap to transponder device areas is within a range of 2:1 to 8:1 according top another aspect of the invention.

In a further aspect of the invention, the transponder device is coated with an adhesive, bonding the transponder device to the cap and to the base layer.

According to another aspect of the invention, an antenna in a dipole antenna configuration is coupled to the transponder device.

BRIEF DESCRIPTION OF THE DRAWINGS

The invention will be described by way of example and with reference to the accompanying drawing in which.

DETAILED DESCRIPTION OF THE INVENTION

Figure 1:
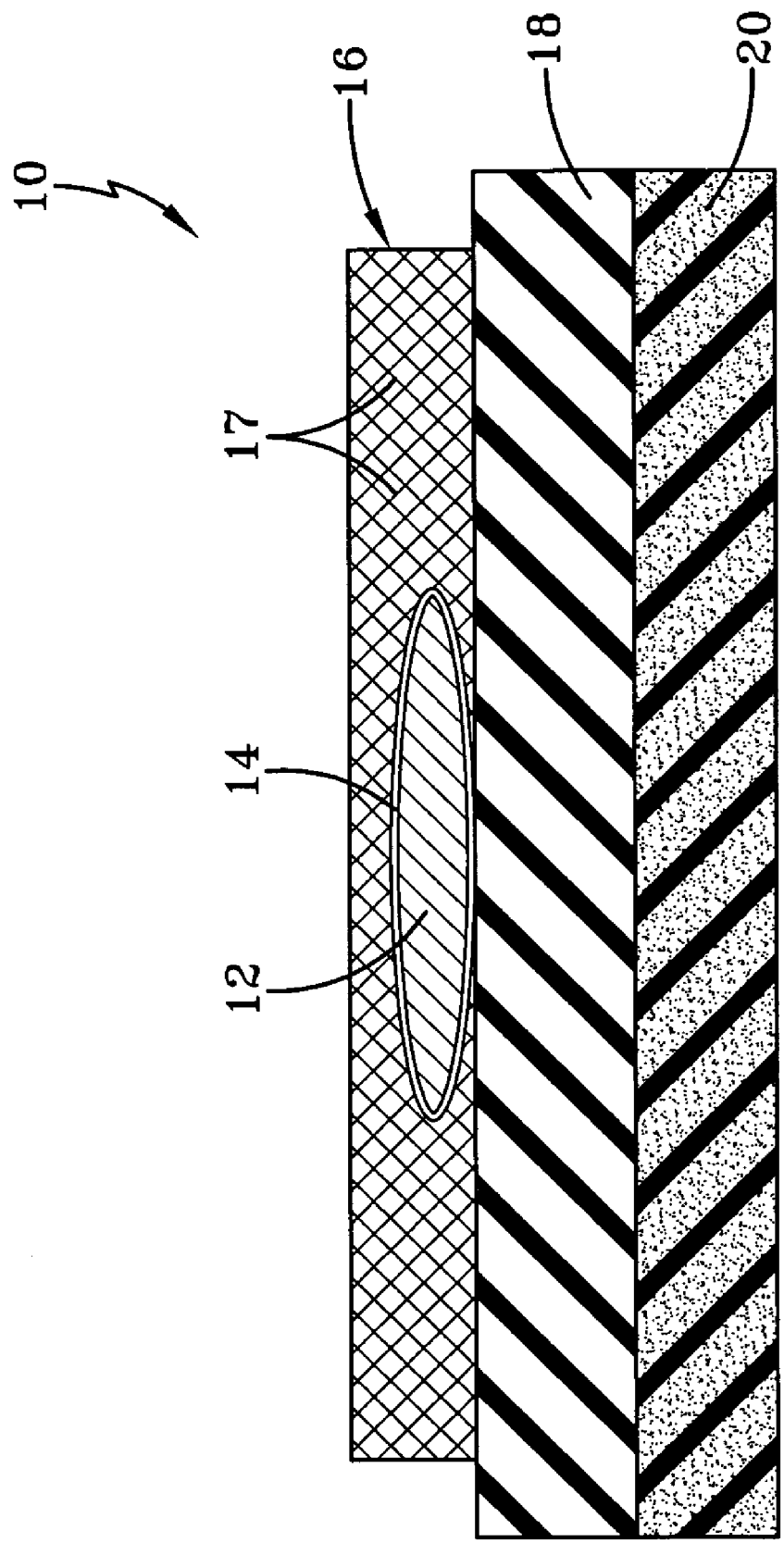
FIG. 1 is a transverse sectional schematic view of a transponder carrier constructed pursuant to the invention.

FIG. 1 shows in schematic representation a transponder carrier device 10. The transponder 12 is represented generically and, according to the invention, may be any electronics device that is intended to function at an embedded location within a host article. Of particular application is the incorporation of an RFID device or tag within the rubber composite material of a tire for the purpose of identifying the tire. The device 10 may also include a sensor component for monitoring a tire condition such as pressure, and communicating the pressure reading to an external reader (not shown). The transponder device 10 is typically rigid in construction. The transponder device 10 is coated with a coating 14 of adhesive of a type commercially available in the industry. A reinforcement cap 16 covers the transponder 12 and a base layer 18 and boding layer 20 underlies the transponder 12 and cap 16.

The completed carrier 10 may be referred to alternatively as a "patch". The patch 10 is an assembly of green compound layers 16, 18, 20 typically cured in compression molds. Adding a tag geometry 12 into the patch 10 can trap small quantities of air and limit expansion of the cap 16 due to trapped air around the tag. The cross-woven cap configuration 16 including cords 17 prevents trapped air from bubbling up and keeps the transponder 12 stationary and attached.

The carrier 10 thus is shown to have three distinct layers although more or fewer layers may be employed if desired. The cap 16 is preferably although not necessarily of rubber that is cord reinforced by cords 17. Cords 17 may be composed of various textile or non-textile materials and is preferably although not necessarily in a square woven configuration. The base layer 18 is made of a productive non-reinforced rubber and the bonding layer 20 is made of a non-productive rubber that having curatives received from either a glue or adhesive or from the green compound to which it is applied. The transponder 12 is coated with an adhesive dip that bonds to the cap and base material.

The cap cords 17 and adhesive coating 14 surrounding the transponder 12 improve the cap capability for retaining the transponder or tag 12. Industry employed tag carrier patches do not apply an adhesive coating on the tags or utilize a reinforcement layer and thus, under certain conditions, may experience ejection of the rigid tag from the patch or a bubbling up of trapped air surrounding the tag.

The reinforced cap 16 improves cap durability at the tag circumference where stress concentrates are imposed by the extreme stiffness difference the patch and the tag during patch flexing. The weave or mesh reinforcement of cords 17 within cap 16 may be of square configuration made of any suitable textile available in the industry such as Nylon 66. The number of ends and picks per dm is 96, +/−4 and the total number of warp ends is 1420. Other weaves may alternatively be used. The nominal linear density (dTex) is 470 and the fabric width (cm) is 146.

The adhesive coating 14 surrounding the tag 12 prevents the tag from being easily dislodged or removed from the patch. Adhering the tag to the patch material in base layer 18 and cap 16 provides added assurance that the tag will remain embedded in the patch and tire at its intended location. The patch 10 is capable of being utilized and applied to a tire in conventional tire repair patch production lines, whereby reducing costs and enhancing its commercial acceptance.

Figure 5:
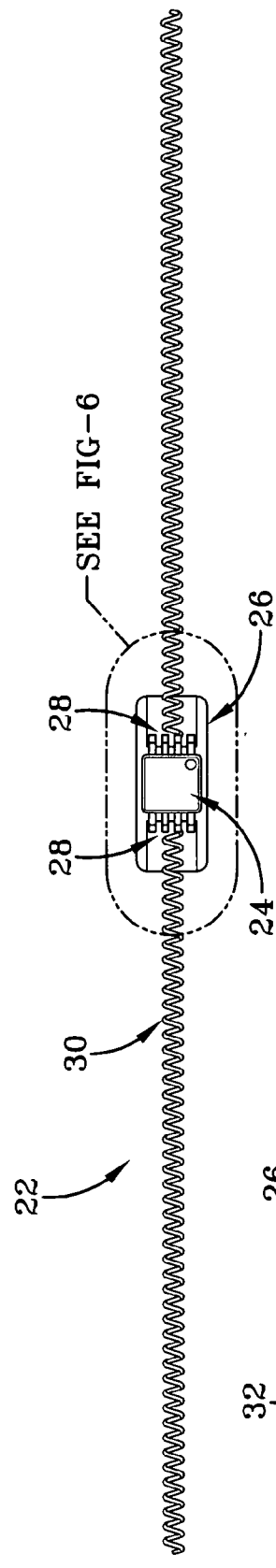
FIG. 5 is a partial enlarged top plan view of the dipole tag embodiment.
Figure 6:
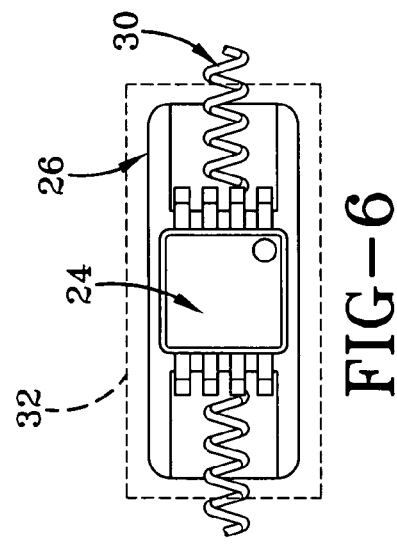
FIG. 6 is a top plan view of the dipole tag and antenna connection shown with the reinforcement cap removed for the purpose of illustration.

Referring to FIGS. 5 and 6, a UHF transponder carrier 22 is shown as one embodiment of the invention in a dipole antenna configuration. The carrier and transponder assembly 22 includes an integrated circuit 24 on a circuit board 26 that is coupled by means of solder connections 28 to a dipole antenna coil 30. An adhesive dip 32 covers the transponder package as explained previously (coating 14 in FIG. 1). The completed assembly 22 may thus be incorporated into a patch as shown in FIG. 1 and embedded within the walls of a tire or other article.

Figure 2:
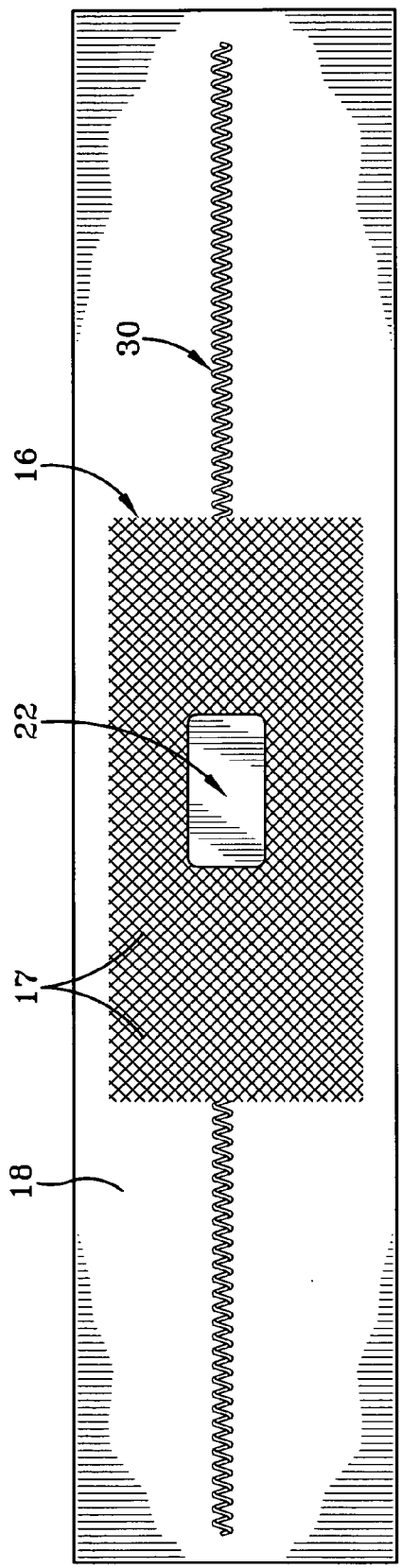
FIG. 2 is a bottom plan view of a dipole tag embodiment of the invention.
Figure 3:
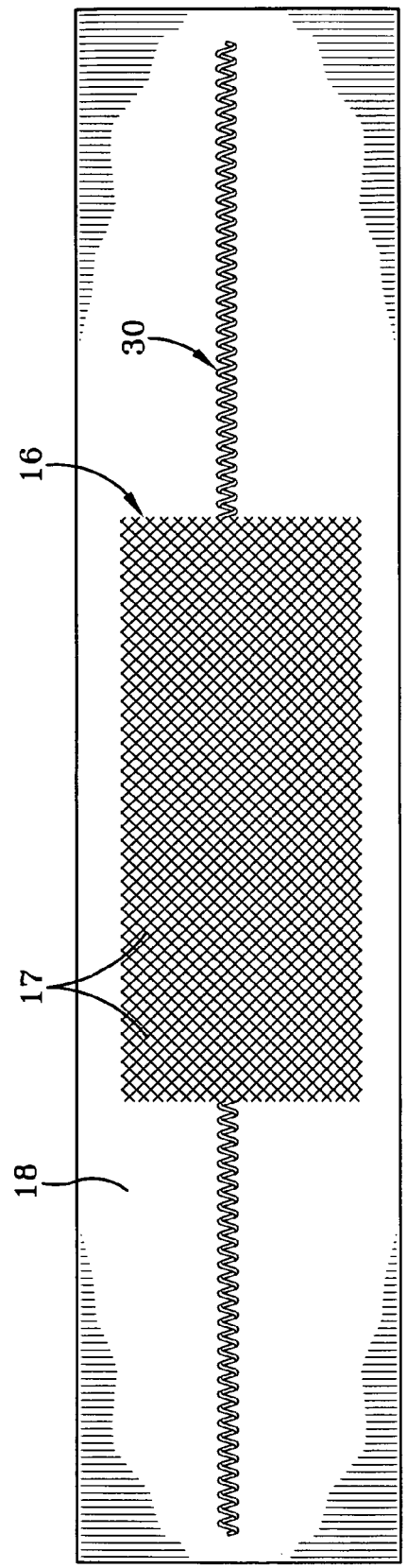
FIG. 3 is a top plan view of the dipole tag embodiment.
Figure 4:
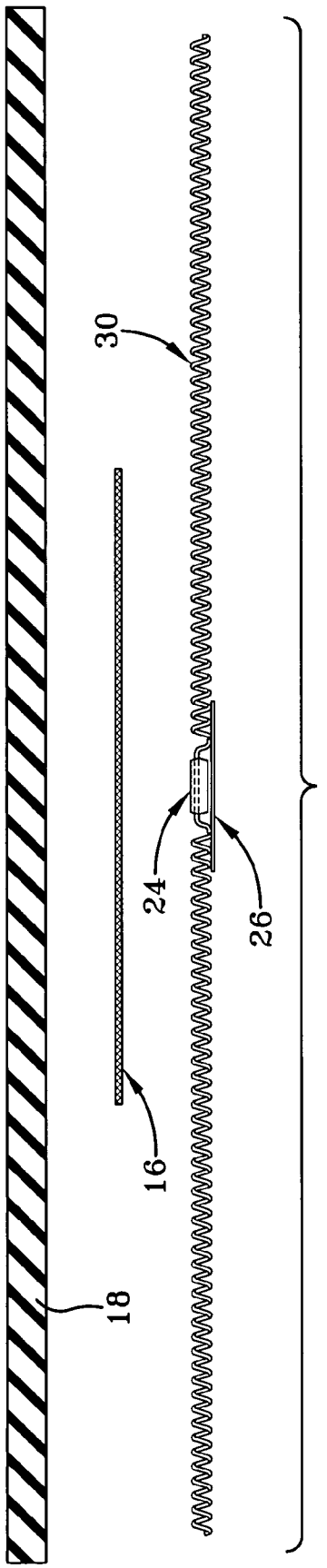
FIG. 4 is a side elevation view of the dipole tag embodiment.

FIGS. 2, 3, and 4 show a UHF tire carrier patch in which the UHF transponder 22 is positioned in the patch with antenna coil 30 projecting outwardly. The reinforcing cap 16 covers the transponder 22 and the base layer 18 underlies. The adhesive coat 14 (not shown) would be applied to the underside of the base layer 18 as described previously. The cross-woven cords 17 within cap 16 prevent any trapped air at the circumference of the transponder 22 from bubbling up. The adhesive coating surrounding transponder 22 further holds the transponder in place within the patch and prevents ejection of the transponder from the patch as a result of differences in stiffness between the tag 22 and the patch layers 16, 18 during patch flexing.

The ratio of reinforcement area represented by cap 16 to tag 22 area is shown in FIGS. 2, 3, and 4 as approximately 8:1. The ratio of reinforcement coverage to tag area may be varied within a range of 2:1 to 8:1. The sizing of the dipole antenna may further be adjusted if so desired such that the reinforcement cap 16 covers the antenna 30 as well as the transponder 22 in order to render the antenna 30 more durable.

From the foregoing, it will be appreciated that the subject transponder carrier, or patch, achieves the benefits of providing a cost effective package construction for embedding a tag within an article such as a tire wall. The package reinforces the patch by means of the cord-reinforced cap 18 positioned to at least partially cover the transponder 22 and/or antenna 30. The cords 17 within cap 18 are woven into a mesh that allows any formed air pockets to escape from the circumference of the transponder 22. Moreover, the adhesive dip surrounding the transponder 22 securely holds the transponder 22 in position within the tag and deters any separation that might otherwise occur from patch flexure.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising:
   a. a tire wall;
   b. a transponder carrier affixed to the tire wall, the carrier comprising: a bonding layer; a base layer affixed to the bonding layer, the base layer having a support surface for supporting a transponder device and an antenna coupled to the transponder device; and a mesh-woven reinforcement cap overlaying in contacting engagement with the base layer supporting surface and covering the transponder device, the transponder device residing within a centrally located space defined between and enclosed by the reinforcement cap and the base layer and the reinforcement cap having a plurality of through air passageways operably sized and positioned for evacuating air from adjacent the transponder device through the reinforcement cap whereby operably deterring separation of the transponder device from the base layer supporting surface.

2. A tire according to claim 1, wherein the cap is composed at least partially of textile cord reinforced rubber.

3. A tire according to claim 2, wherein the cap textile cords are in a substantially quadrilateral woven configuration.

4. A tire according to claim 3, wherein a ratio of the cap to transponder device areas is within a range of 2:1 to 8:1.

5. A tire according to claim 3, wherein the cap textile cords are composed at least partially of monofilament Nylon 66.

6. A tire according to claim 3, wherein the cap textile cords have a nominal linear density dTex of 470.

7. A tire according to claim 3, wherein the cap textile cords are in a substantially square woven configuration having substantially 96 ends/dm and substantially 96 picks/dm.

8. A tire according to claim 1, wherein the antenna extends from the transponder device outward along the support surface of the base layer in contacting engagement with the reinforcement cap and the base layer.

9. A tire according to claim 8, wherein the antenna is in a dipole antenna configuration and the cap at least partially covers in contacting engagement with the antenna.

10. A tire according to claim 1, wherein the reinforcement cap is operably configured to evacuate air from a circumference of the transponder device.

11. A tire according to claim 10, wherein the transponder device is covered with an adhesive coating adhering the transponder device to the reinforcement cap and to the base layer.

12. A tire comprising:
   a. a tire wall;
   b. a transponder carrier affixed to the tire wall and comprising: a bonding layer; a base layer affixed to the bonding layer, the base layer having a support surface for supporting a transponder device; a mesh-woven carrier reinforcement cap composed at least partially of textile cord reinforced rubber overlaying in contacting engagement with the base layer supporting surface and over the transponder device, the cap textile cords being in a substantially quadrilateral woven configuration;
   c. the transponder device residing within a centrally located space defined between and enclosed by the reinforcement cap and the base layer and the reinforcement cap having a plurality of through air passageways operably sized and positioned for evacuating air from adjacent the transponder device through the reinforcement cap whereby operably deterring separation of the transponder device from the base layer supporting surface.

13. A tire according to claim 12, wherein the transponder device is at least partially coated with an adhesive bonding the transponder device to the cap and to the base layer.

14. A tire according to claim 13, wherein a ratio of the cap to transponder device areas is within a range of 2:1 to 8:1.

15. A tire according to claim 13, wherein the base layer is composed of a productive non-reinforced rubber.

16. A tire according to claim 13, wherein the bonding layer is composed of a non-productive rubber utilizing curatives from either an adhesive or an uncured compound of the rubber article into which the transponder carrier is embedded.

17. A tire according to claim 12, wherein the cap textile cords are composed at least partially of monofilament Nylon 66 having a nominal linear density dTex of 470.

18. A tire according to claim 17, wherein the cap textile cords are in a substantially square woven configuration having substantially 96 ends/dm and substantially 96 picks/dm.

19. A tire according to claim 12, wherein further comprising an antenna coupled to and lying adjacent the transponder device on the base layer supporting surface.

20. A tire according to claim 19, wherein the antenna is in a dipole antenna configuration and the cap at least partially covers in contacting engagement with the antenna.

* * * * *